(12) United States Patent
Wu

(10) Patent No.: US 10,571,966 B2
(45) Date of Patent: Feb. 25, 2020

(54) TOUCH PANEL AND DISPLAY DEVICE

(71) Applicant: BOE TECHNOLOGY GROUP CO., LTD., Beijing (CN)

(72) Inventor: Zhongbao Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/014,671

(22) Filed: Jun. 21, 2018

(65) Prior Publication Data
US 2019/0204870 A1 Jul. 4, 2019

(30) Foreign Application Priority Data

Jan. 3, 2018 (CN) .......................... 2018 1 0006012

(51) Int. Cl.
*G06F 1/16* (2006.01)
*G06F 3/041* (2006.01)
*G06F 3/042* (2006.01)

(52) U.S. Cl.
CPC .......... *G06F 1/1643* (2013.01); *G06F 3/0412* (2013.01); *G06F 3/0421* (2013.01)

(58) Field of Classification Search
CPC ..... G06F 1/1643; G06F 3/0412; G06F 3/0421
See application file for complete search history.

(56) References Cited

U.S. PATENT DOCUMENTS

| 4,691,363 | A | * | 9/1987 | Khanna | H04R 1/04 381/191 |
| 4,836,023 | A | * | 6/1989 | Oikawa | G01C 19/5642 310/321 |
| 5,696,519 | A | * | 12/1997 | Suzuki | H01Q 3/18 343/761 |
| 8,639,471 | B2 | * | 1/2014 | Baxter | G01S 5/16 702/152 |
| 8,875,652 | B2 | * | 11/2014 | Feinstein | B05C 9/12 118/402 |
| 2004/0118210 | A1 | * | 6/2004 | Tooma | B06B 1/06 73/625 |
| 2004/0135773 | A1 | * | 7/2004 | Bang | G06F 3/0421 345/173 |
| 2006/0099023 | A1 | * | 5/2006 | Katz | G06F 3/0221 400/472 |
| 2011/0157064 | A1 | * | 6/2011 | Imai | G06F 3/0416 345/173 |

(Continued)

*Primary Examiner* — Sejoon Ahn
(74) *Attorney, Agent, or Firm* — Kinney & Lange, P.A.

(57) ABSTRACT

A touch panel and a display device are provided. The touch panel includes: a display screen, and a supporting frame configured to mount the display screen thereon; an infrared transmitter and an infrared receiver are provided on the supporting frame, the infrared transmitter being configured to emit infrared light so as to form an infrared light field above the display screen; the infrared receiver being configured to receive the infrared light emitted by the infrared transmitter and in turn reflected at a floating touch position above the display screen, the infrared transmitter and the infrared receiver cooperating with each other to determine the floating touch position; and the infrared transmitter and the supporting frame are formed as an integral structure. The display device includes the touch panel as above and an outer frame in which the touch panel is mounted.

9 Claims, 8 Drawing Sheets

(56) References Cited

U.S. PATENT DOCUMENTS

| | | | |
|---|---|---|---|
| 2012/0127141 A1* | 5/2012 | Choi | H04N 5/64 345/207 |
| 2012/0154486 A1* | 6/2012 | Anderson | B41J 2/155 347/40 |
| 2014/0264036 A1* | 9/2014 | Hung | G06F 3/0421 250/349 |
| 2015/0055211 A1* | 2/2015 | Chang | G02B 5/208 359/350 |
| 2015/0180472 A1* | 6/2015 | Su | H05K 1/0274 349/12 |
| 2016/0073033 A1* | 3/2016 | Ogasawara | A63F 13/428 348/207.1 |
| 2016/0306500 A1* | 10/2016 | Zhu | G06F 3/0412 |

* cited by examiner

TOUCH PANEL AND DISPLAY DEVICE

CROSS-REFERENCE TO RELATED DISCLOSURE

The present disclosure claims the benefit of Chinese Patent Application Disclosure No. 201810006012.3 filed on Jan. 3, 2018 in the State Intellectual Property Office of China, the whole disclosure of which is incorporated herein by reference.

BACKGROUND OF THE DISCLOSURE

Field of the Disclosure

Embodiments of the present disclosure relate to the technical field of display, and particularly to a touch panel and a display device.

Description of the Related Art

Touch control technology is mainly implemented on a basis of a capacitive touch screen, for example. Two types of capacitance-type sensors, i.e., both a mutual capacitance sensor and a self-capacitance sensor, are typically applied. For example, the mutual capacitance sensor may be used in implementing a conventional multi-touch functionality, and the self-capacitance sensor may be used more broadly in implementing a single touch functionality. With booming development in touch control technology, floating touch technology is gradually becoming an emerging touch operating mode in relevant markets.

Floating touch technology means that an operation similar to a mouse movement may be obtained by a movement of a hand remaining at a certain distance above a touch screen when a user utilizes the touch screen, such that a touch operation is implemented without any touch with the touch screen. Existing floating touch technologies are mainly implemented based on an infrared light field.

SUMMARY OF THE DISCLOSURE

A touch panel and a display device are provided in embodiments of the disclosure.

According to an aspect of an exemplary embodiment of the present disclosure, there is provided a touch panel, including: a display screen; and a supporting frame configured to mount the display screen thereon; an infrared transmitter and an infrared receiver are provided on the supporting frame, the infrared transmitter being configured to emit infrared light so as to form an infrared light field above the display screen; the infrared receiver being configured to receive the infrared light emitted by the infrared transmitter and in turn reflected at a floating touch position above the display screen, the infrared transmitter and the infrared receiver cooperating with each other to determine the floating touch position; and the infrared transmitter and the supporting frame are formed to be an integral structure.

In an embodiment of the disclosure, the supporting frame is provided therein with an accommodation groove, in which the infrared transmitter and a transparent resin encapsulating the infrared transmitter are received.

In an embodiment of the disclosure, the infrared transmitter is provided on a bottom portion of the accommodation groove, with a wiring hole provided through the bottom portion.

In an embodiment of the disclosure, the infrared transmitter includes at least one infrared transmitter chip connected with a print circuit board through the wiring hole.

In an embodiment of the disclosure, the accommodation groove includes a side wall provided obliquely and inclined at an angle approximately between 1° and 30° relative to the display screen, the at least one infrared transmitter chip abutting closely against the side wall.

In an embodiment of the disclosure, the at least one infrared transmitter chip includes a plurality of infrared transmitter chips provided on one or more side portions of the supporting frame.

In an embodiment of the disclosure, the supporting frame includes a ceramic frame.

In an embodiment of the disclosure, the infrared receiver and the supporting frame are also formed integrally; and the supporting frame is provided therein with a mounting groove, in which the infrared receiver is received.

In an embodiment of the disclosure, the infrared receiver includes an infrared camera which has a viewing angle of 180°.

In an embodiment of the disclosure, the infrared transmitter includes an infrared light source.

According to another aspect of an exemplary embodiment of the present disclosure, there is provided a display device including: the touch panel as above; and an outer frame in which the touch panel is mounted.

In an embodiment of the disclosure, the display device further includes: a backlight module, which is provided to abut against the touch panel tightly and is also mounted in the outer frame.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION OF EMBODIMENTS OF THE DISCLOSURE

Figure 1:
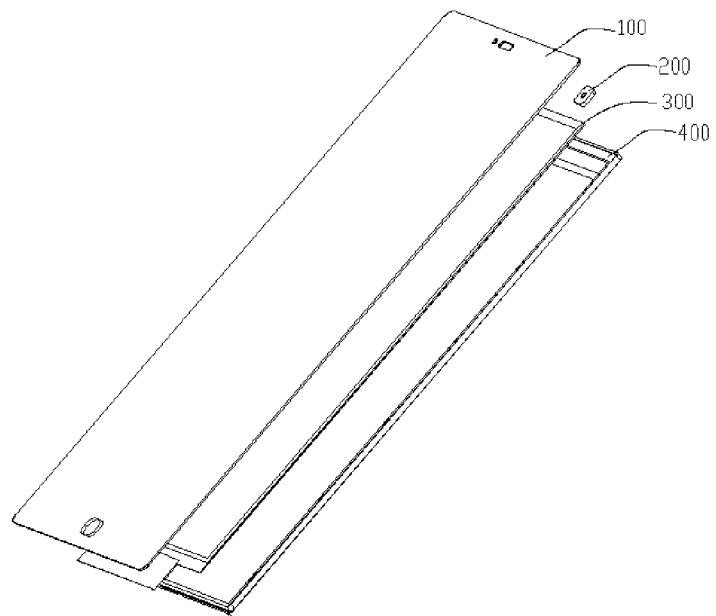
FIG. 1 illustrates a structural schematic view a touch panel according to an embodiment of the disclosure.

Exemplary embodiments of the present disclosure will be described hereinafter in detail with reference to the attached drawings, wherein like reference numerals refer to like elements. The present disclosure may, however, be embodied in many different forms, and thus the detailed description of the embodiments of the disclosure in view of attached drawings should not be construed as being limited to the embodiments set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimensions and shapes of each component in the drawings are only intended to exemplarily illustrate the contents of the disclosure, rather than to demonstrate the practical dimensions or proportions of components of a touch panel for the blind and a display device.

According to a general technical concept of embodiments of the present disclosure, as illustrated in FIG. 1, in a first aspect of the embodiments of the disclosure, there is provided a touch panel, including: a display screen 300; and a supporting frame 400 configured to mount the display screen 300 thereon. An infrared transmitter and an infrared receiver are provided on the supporting frame 400, the infrared transmitter being configured to emit infrared light so as to form an infrared light field above the display screen 300, and including an infrared light source; the infrared receiver being configured to receive the infrared light emitted by the infrared transmitter and in turn reflected thereto, the infrared transmitter and the infrared receiver cooperating with each other to determine a floating touch position away from and above the display screen, at which floating touch position the infrared light emitted by the infrared transmitter is reflected towards the infrared receiver; and the infrared transmitter and the supporting frame 400 are formed to be an integral structure.

In a specific operation, the aforementioned infrared transmitter is embedded within the supporting frame 400, e.g., a relevant infrared emitter, such as an infrared light source including an infrared lamp, and the like; and for example, the aforementioned infrared transmitter and the supporting frame 400 are formed to be an integral structure. In other words, in a subsequent assembly process of the touch panel, it is only required to connect the supporting frame 400 with the display screen 300, without any operation for connecting the infrared transmitter; and the integral structure of the aforementioned infrared transmitter and the supporting frame 400 may ensure a structural stability of the infrared transmitter effectively and avoid any damage to products by accident in the subsequent assembly process.

Figure 2:
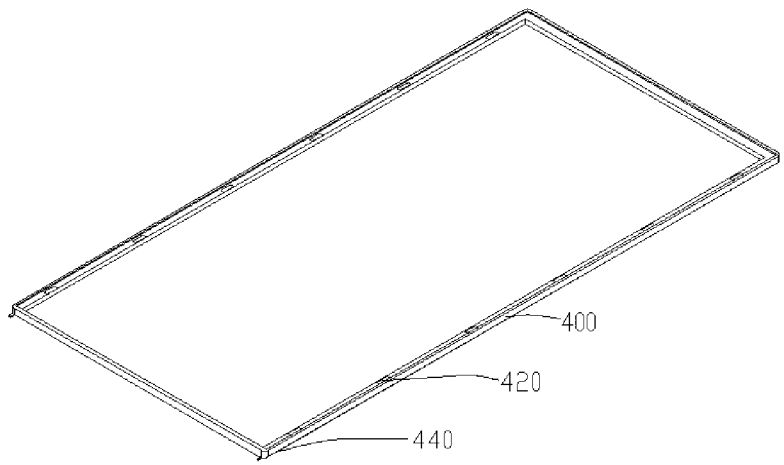
FIG. 2 illustrates a structural schematic view of a supporting frame according to an embodiment of the disclosure.

In view of FIG. 1 and FIG. 2, a protective cover 100 is fitted on an upper surface of the display screen 300. In a specific operation, by providing the protective cover 100, a structural stability of the display screen 300 and its internal components may be enhanced effectively, and an overall structural stability of the assembly may in turn be enhanced effectively.

Figure 3:
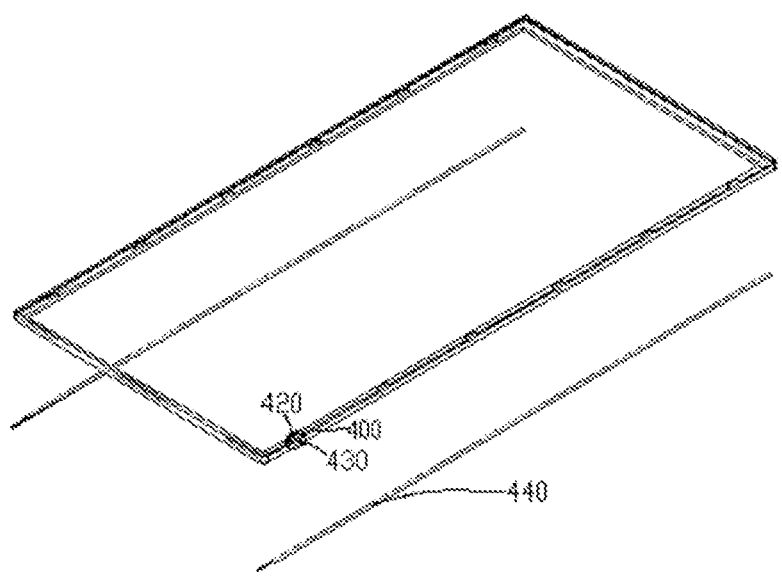
FIG. 3 illustrates an exploded schematic view of a supporting frame according to an embodiment of the disclosure.
Figure 4:
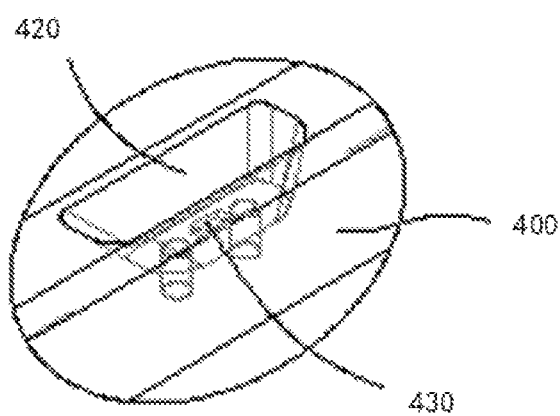
FIG. 4 illustrates a partially enlarged view at a location indicated by a closed ring as illustrated in FIG. 3.

In view of FIG. 3 and FIG. 4, the infrared transmitter according to the embodiment of the disclosure includes an infrared transmitter chip 430 encapsulated within the supporting frame 400, and the supporting frame 400 is provided with a print circuit board 440 configured to supply (electrical) power to the infrared transmitter chip 430. An emitting head of the infrared transmitter chip 430 is for example arranged at a certain angle; more specifically, the emitting head is provided at an angle ranging between approximately 1° and 30° with respect to the display screen 300.

In a specific operation, the supporting frame 400 is for example provided with an accommodation groove therein, which accommodation groove is configured to accommodate the infrared transmitter chip 430 so as to provide an independent installation space for the infrared transmitter chip 430, such that a structural stability of the infrared transmitter chip 430 may be ensured effectively.

Figure 5:
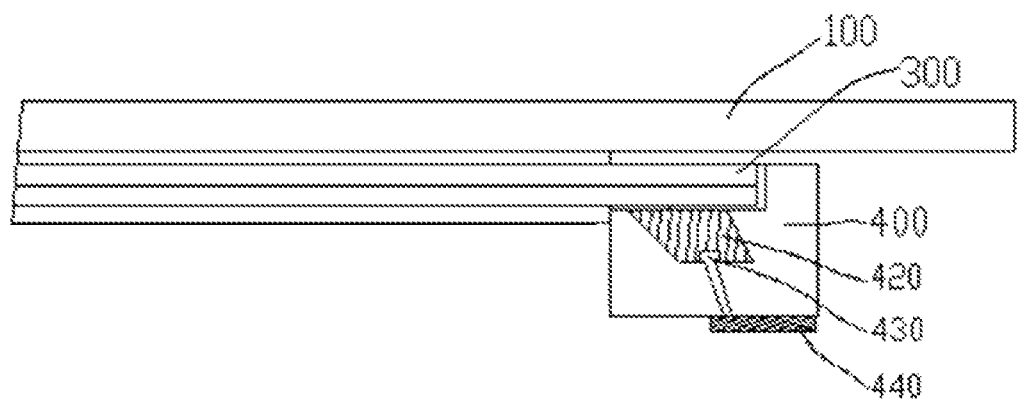
FIG. 5 illustrates a schematic assembly view of an infrared transmitter according to an embodiment of the disclosure.

In view of FIG. 4 and FIG. 5, the infrared transmitter chip 430 is for example provided on a bottom portion of the accommodation groove, e.g., with a wiring hole formed through the bottom portion of the accommodation groove, so as to facilitate a convenient connection between the infrared transmitter chip 430 and the printed circuit board 440; and a package/encapsulation operation of the infrared transmitter chip 430 is implemented by further injecting a transparent resin 420 into the accommodation groove. In a specific operation, a fit between the accommodation groove and the transparent resin filled therein may ensure an overall structural stability of the infrared transmitter chip 430, so as to avoid effectively any structural damage to the infrared transmitter chip 430 by an interference of any external component(s).

In the embodiment, the accommodation groove is defined by its side wall provided obliquely and inclined at an angle between approximately 1° and 30° relative to the display screen, against which side wall the infrared transmitter chip abuts closely. The side wall provided obliquely is intended to cooperate with the emitting head of the infrared transmitter chip 430 such that there is a certain angle between an infrared light emitted therefrom and a plane in which the display screen lies, so as to construct an infrared light field above the display screen 300.

Figure 6:
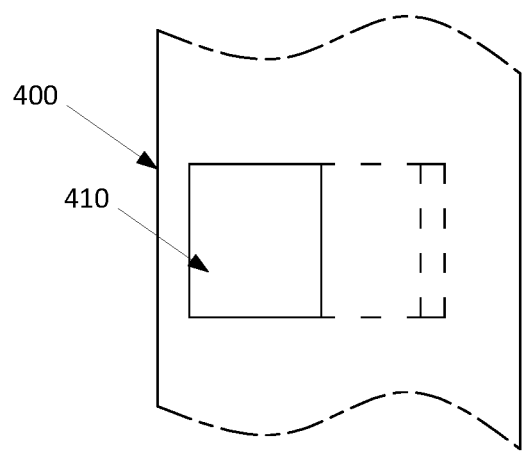
FIG. 6 illustrates a structural schematic view of an accommodation groove in one condition according to an embodiment of the disclosure.
Figure 7:
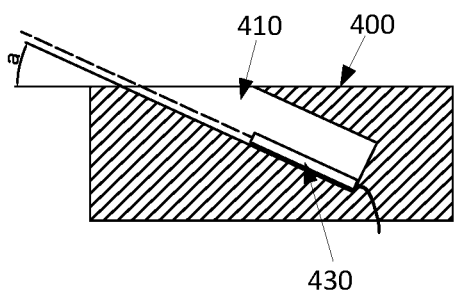
FIG. 7 illustrates a schematic sectional view of the accommodation groove as illustrated in FIG. 6.

The accommodation groove of the embodiment is specifically constructed as follows:

In view of FIG. 6 and FIG. 7, the accommodation groove 410 is for example formed obliquely in the supporting frame 400, such that the bottom portion of the accommodation groove is shielded by a portion of the supporting frame located thereabove, without being exposed vertically upwards. The accommodation groove 410 is for example in a form of a strip shape and set to be totally inclined, with an opening of the accommodation groove 410 pointing to a central region above the display screen; an inclination angle at which the accommodation groove 410 is inclined is labeled by 'a' as illustrated, i.e., the angle between each of the side walls of the accommodation groove 410 and the plane in which the display screen lies is an angle 'a', for example ranging between 1° and 30°. The accommodation groove 410 provided obliquely as above is intended to ensure that the infrared light emitted by the emitting head of the infrared transmitter chip 430 succeeds in forming the infrared light field above the display screen so as to meet practical application requirements; and since the accommodation groove 410 is provided in the form of a strip shape, it is characterized in its relatively small spatial occupation, and in turn an improved structural stability of the supporting frame 400, so as to avoid effectively a defect of a relatively poor stability of the supporting frame 400 caused by a relatively large volume of the accommodation groove 410.

Figure 8:
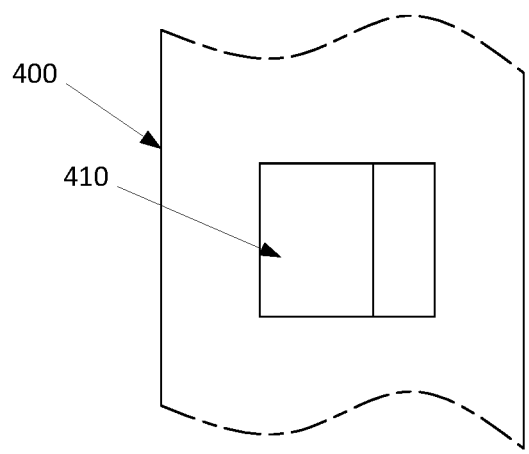
FIG. 8 illustrates a structural schematic view of an accommodation groove in another condition according to an embodiment of the disclosure.
Figure 9:
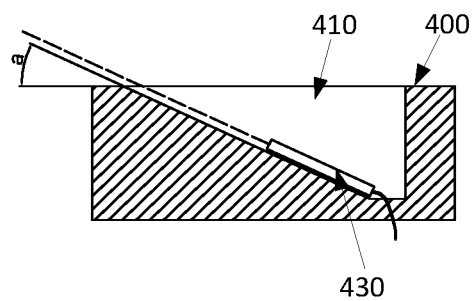
FIG. 9 illustrates a schematic sectional view of the accommodation groove as illustrated in FIG. 8.

The accommodation groove of the embodiment may also be specifically constructed as follows:

In view of FIG. 8 and FIG. 9, the accommodation groove 410 includes only one inclined side wall, and further includes a vertical side wall, such that the bottom portion of the accommodation groove is directly exposed vertically upwards; and there is an angle 'a' between the inclined side wall and the plane in which the display screen lies, for example, ranging between 1° and 30°. In a specific operation, the emitting head of the infrared transmitter chip 430 abuts against the inclined side wall tightly, so as to ensure that the infrared light emitted by the emitting head of the infrared transmitter chip 430 falls within a preset angle range, and finally the infrared light field above the display screen is formed.

Figure 10:
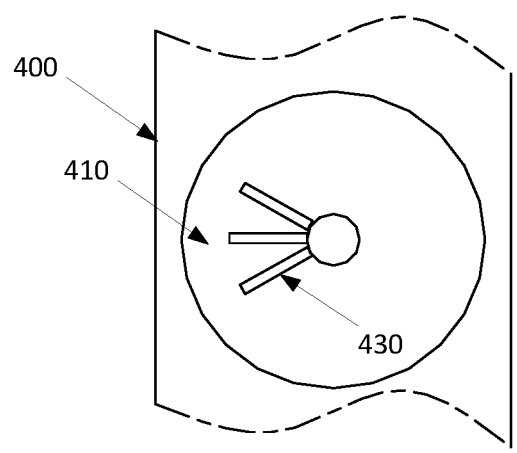
FIG. 10 illustrates a structural schematic view of an accommodation groove in still another condition according to an embodiment of the disclosure.
Figure 11:
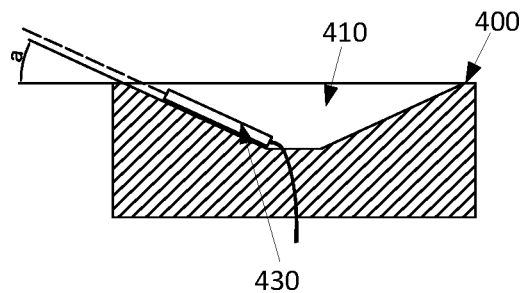
FIG. 11 illustrates a schematic sectional view of the accommodation groove as illustrated in FIG. 10.

The accommodation groove of the embodiment may still be specifically constructed as follows, alternatively:

In view of FIG. 10 and FIG. 11, the accommodation groove 410 is, for example, in a form of a concave shape which is recessed downwards and inwards gradually, i.e., in the form of a bowl shape, with an annulus side wall thereof being provided obliquely. As such, the accommodation groove 410 in the bowl shape may possess a relatively large installation space so as to implement an installation of a plurality of infrared transmitter chips 430 and in turn to construct the infrared light field more intensely. The side wall of bowl-shape accommodation groove 410 has its inclined angle labeled by 'a' as illustrated, i.e., the angle between the side wall of the accommodation groove 410 and the plane in which the display screen lies is the angle 'a', for example, ranging between 1° and 30°.

In an embodiment, there may be a plurality of infrared transmitter chips 430 which are provided on one or more side portions of the supporting frame 400.

In a specific operation, the plurality of infrared transmitter chips 430 are, for example, provided respectively on a long side portion of the supporting frame 400, or on two long side portions; or, for example, provided on two short side portions of the supporting frame 400, or, for example, provided on four side portions of the supporting frame 400, so as to construct the infrared light field more intensely, and to increase specific number of infrared light to be reflected by a barrier, such that an operation of precise positioning of the barrier may eventually be improved effectively.

In an embodiment of the disclosure, the supporting frame 400 includes a ceramic frame; and by providing the ceramic frame, a technical effect of an integral forming and a short process flow may be obtained. In addition, the ceramic frame has a relatively higher structural stability, and an improved heat dissipation property, so as to improve effectively both heat dissipation efficiency, and the structural stability of each infrared transmitter chip 430.

In a specific operation, the supporting frame 400 may, for example, be a carbon fiber ceramic compound frame. The supporting frame 400 includes a ceramic bezel, and a carbon fiber middle frame board which is located inside and integrally formed with the ceramic bezel. The carbon fiber middle frame board is a carbon fiber structure which is formed by processing carbon fiber sheets laid and overlapped in a staggered manner inside the ceramic bezel by both a three-dimensional (3D) shaping process and a thermo-compression curing process. The carbon fiber ceramic compound frame adopts a frame body structure by compound forming of the ceramic bezel and the carbon fiber middle frame board, such that effects on the assembly of the product by a contraction of ceramic material may be eliminated in a condition that the middle frame of an electronic product is formed by the ceramic material, and the carbon fiber ceramic compound frame may readily be processed by the subsequent processing so as to meet requirements on assembly of a ceramic piece and other structural component (s) and to implement a precise assembly, and in turn to further solve problems such as the installation of the infrared transmitter chip(s) 430 and the like.

Additionally, the ceramic material has superior electrical properties, and may not influence radio frequency functionality so as to facilitate improvement in signal performance. Furthermore, the ceramic material also has an abrasion resistance, a skin-friendly feeling, an air-tightness, and a heat dissipation property; and the above carbon fiber is also a thermally conductive carbon fiber, such that the supporting frame 400 may possess fine mechanical properties, electrical conductivity and superior thermal conductivity and radiant heat dissipation capacity, so as to further solve problems such as heat dissipation of the infrared transmitter chip(s) 430 and the like.

In an embodiment of the disclosure, the infrared receiver and the supporting frame 400 are also formed as an integral structure, and the infrared receiver is, for example, embedded inside the supporting frame 400 so as to form an integral connection structure there between. The integral connection structure may also decrease labor strength/intensity in a subsequent assembly process of the panel and enhance a structural stability of the infrared receiver, effectively.

In a specific operation, the supporting frame 400 is, for example, provided with a mounting groove therein, which may have a structure similar to the structure of the accommodation groove. In other words, the infrared receiver is received within the mounting groove. As per practical requirements, it is selected whether a corresponding encapsulating/package operation is carried out by the transparent resin or by other material(s). By providing the mounting groove, the infrared receiver and the supporting frame 400 are also formed as an integral structure, so as to enhance the structural stability of the infrared receiver effectively. The above mounting groove may, for example, be in the form of a bowl shape and configured to fit with the infrared receiver for facilitating an operation of receiving the emitted infrared light in a large viewing angle range.

In an embodiment of the disclosure, the infrared receiver, for example, includes at least one infrared camera 200, whose viewing angle is, for example, 180°. Each infrared camera 200 has beneficial technical effects such as rational construction, convenient installation, friendly maintenance, and the like.

In a specific operation, the at least one infrared camera 200 is, for example, provided on the supporting frame 400 at a position of a via-hole below the protective cover 100. The at least one infrared camera 200 may alternatively be provided at other positions of the supporting frame 400, and specifically, may be provided on at least one long side portion, on at least one short side portion, or on both long side portion(s) and short side portion(s) of the supporting frame 400. The at least one infrared camera 200 and the infrared transmitter chip(s) 430 may, for example, be provided in a staggered manner, e.g., provided opposite to each other, specifically, such that they are arranged at respective positions to ensure the infrared light reflected by the barrier may be received.

Figure 12:
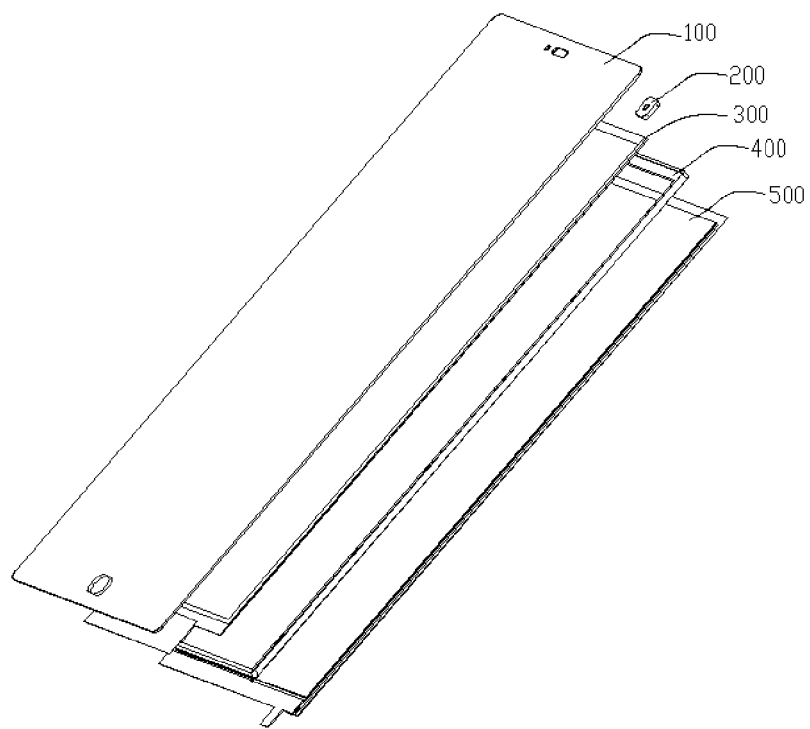
FIG. 12 illustrates a structural schematic view of another embodiment of the disclosure.

According to another aspect of embodiments of the disclosure, as illustrated in FIG. 12, a display device is provided, including the touch panel according to above embodiments and an outer frame in which the touch panel is mounted, i.e., the touch panel includes the display screen 300 and the supporting frame 400 configured to mount the display screen 300 thereon. The display device may further include a backlight module 500, which is provided to abut against the touch panel tightly and is also mounted in the outer frame. By providing above supporting frame 400, an operation of fixing and connecting the display screen 300 and the backlight module 500 may be implemented.

Figure 13:
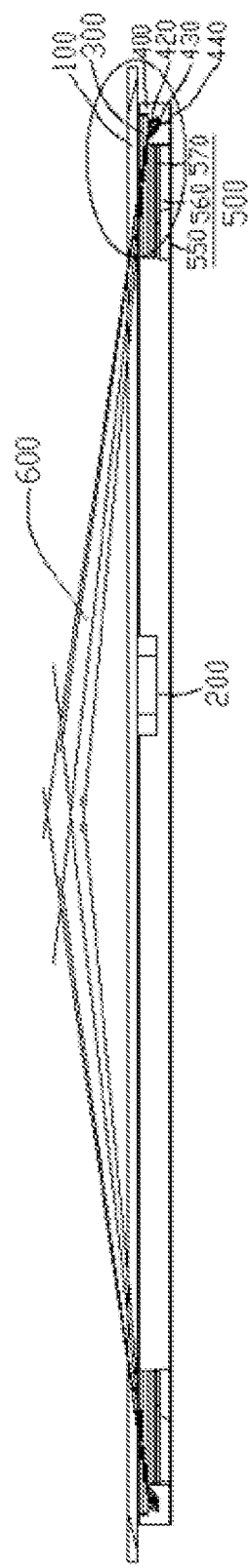
FIG. 13 illustrates a schematic view of an infrared light field according to an embodiment of the disclosure.

As illustrated in FIG. 13, the infrared transmitter(s) as above may emit a plurality of infrared light rays, which cooperate with one another to form collectively an infrared light field over the display screen 300. The infrared receiver may implement an operation of receiving the reflected infrared light, i.e., once a barrier (e.g., a finger) enters a region of the infrared light field over the display screen 300, the infrared light may be reflected by the barrier such that the reflected infrared light may then be received by the infrared receiver. Furthermore, the infrared receiver is connected with a processing module configured to determine a specific position of the barrier depending on the reflected infrared light. By providing the processing module, an accurate position of the barrier may be determined depending on the reflected infrared light which is received by the infrared receiver. In addition, since the infrared light belongs to an invisible light, it may not influence a normal display operation of the display device.

In a specific operation, each infrared signal, for example, corresponds to one infrared transmitter chip, and the processing module may, for example, determine a path of the reflected infrared light in a condition that a floating touch action occurs, depending on the reflected infrared light which is received by the infrared receiver. Then, by way of example, a distance between a floating touch point position at which the floating touch action occurs and the corresponding infrared receiver may be determined, depending on an angle between the reflected infrared signal which is received by the infrared receiver and the plane in which the display screen lies, and a distance between one infrared receiver and a corresponding infrared transmitter. Finally, for example, the coordinates of the floating touch point position may be determined, for example, depending on the distance between the floating touch point position at which the floating touch action occurs and the corresponding infrared receiver, as calculated above, as well as the path of the reflected infrared light in a condition that a floating touch action occurs, as determined above. In other words, the accurate position of the barrier may be determined.

Figure 14:
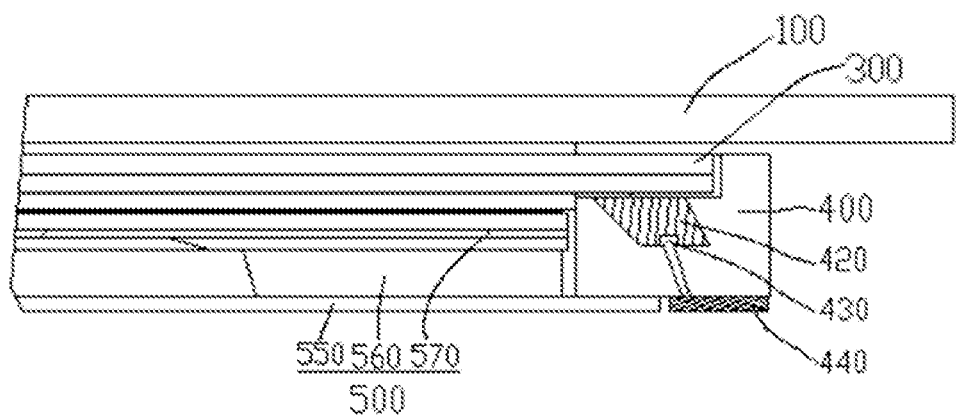
FIG. 14 illustrates a partially enlarged view of FIG. 13.

In view of FIG. 13 and FIG. 14, the backlight module 500 in an embodiment of the disclosure, includes a reflector 550 located below the supporting frame 400, a light guide plate 560 above an upper surface of the reflector 550, and an optical film sheet 570 located on an upper surface of the light guide plate 560. By providing the reflector 550, the light guide plate 560 and the optical film sheet 570, practical application requirements may be met effectively, and a normal display operation of the display screen 300 may also be ensured effectively.

Figure 15:
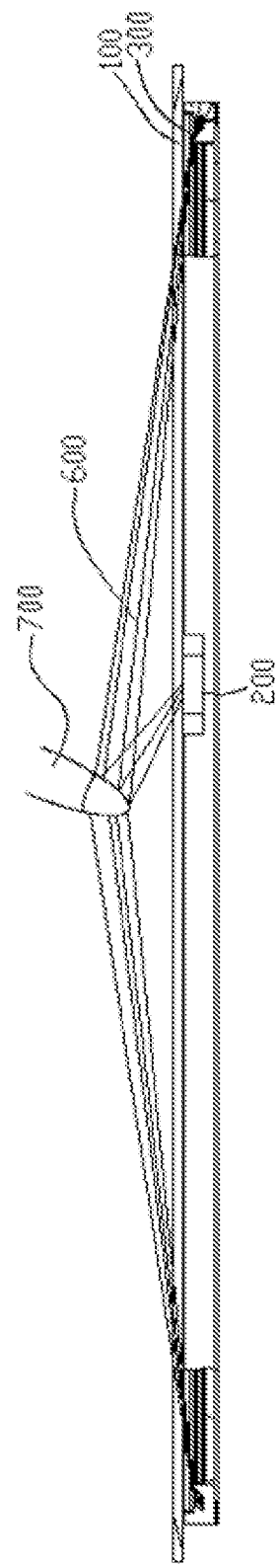
FIG. 15 illustrates a schematic view of a floating trigger implemented in an embodiment of the disclosure.

As illustrated in FIG. 15, taking a finger 700 which carries out a floating touch action as an example, once the finger 700 enters the region of the infrared light field 600 above the display screen 400, an intensity of the infrared light field 600 changes, and a portion of the infrared light is reflected by a surface of the finger 700 and is then received by the corresponding infrared camera 200. The processing module then determines the accurate position of the finger 700 depending on the reflected infrared light, and the display device in turn carries out a corresponding action depending on the floating touch action (or a finger motion/gesture) of the user.

The solutions of above embodiments of the disclosure have following beneficial technical effects:

As compared with relevant art, according to the embodiments of the disclosure, by providing the integral structure of the supporting frame and the infrared transmitter as above, the structural stability of the infrared transmitter may be ensured effectively, so as to avoid any unexpected damage to the transmitter chip during a subsequent assembly process, and to effectively solve problems concerning installation and heat dissipation of the infrared transmitter.

In embodiments of the disclosure, terminologies such as "providing", "connecting", "fixing" and the like may be comprehended in a broad sense, e.g., "connecting" may, for example, refer to a fixed connection or a detachable connection, or an integral connection, for example, a direct connection or an indirect connection by an inter-medium. As to those skilled in the art, specific meanings of the terminologies should be comprehended in specific context.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present disclosure exemplarily, and should not be deemed as a restriction thereof.

Although several exemplary embodiments of the general concept of the present disclosure have been shown and described, it would be appreciated by those skilled in the art that various changes or modifications may be made in these embodiments without departing from the principles and spirit of the disclosure and lie within the scope of present application, which scope is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "including", "comprising", or "having" an element or a plurality of elements having a particular property may include additional such elements not having that property.

What is claimed is:

1. A touch panel, comprising:
a display screen; and
a supporting frame configured to mount the display screen thereon;
wherein an infrared transmitter and an infrared receiver are provided on the supporting frame, the infrared transmitter being configured to emit infrared light so as to form an infrared light field above the display screen;

wherein the infrared receiver is configured to receive the infrared light emitted by the infrared transmitter and reflected at a floating touch position above the display screen, the infrared transmitter and the infrared receiver cooperating with each other to determine the floating touch position;

wherein the infrared transmitter and the supporting frame are formed as an integral structure;

wherein the supporting frame is provided with an accommodation groove in which the infrared transmitter and a transparent resin encapsulating the infrared transmitter are received, the infrared transmitter is provided on a bottom portion of the accommodation groove with a wiring hole provided through the bottom portion; and wherein the infrared receiver and the supporting frame are also formed integrally, and the supporting frame is provided therein with a mounting groove in which the infrared receiver is received.

2. The touch panel according to claim 1, wherein the infrared transmitter comprises at least one infrared transmitter chip connected with a printed circuit board through the wiring hole.

3. The touch panel according to claim 2, wherein the accommodation groove comprises a side wall provided obliquely and inclined at an angle between approximately 1° and 30° relative to the display screen, the at least one infrared transmitter chip abutting closely against the side wall.

4. The touch panel according to claim 2, wherein the at least one infrared transmitter chip comprises a plurality of infrared transmitter chips provided on one or more side portions of the supporting frame.

5. The touch panel according to claim 1, wherein the supporting frame comprises a ceramic frame.

6. The touch panel according to claim 1, wherein the infrared receiver comprises an infrared camera which has a viewing angle of 180°.

7. The touch panel according to claim 1, wherein the infrared transmitter comprises an infrared light source.

8. A display device comprising:
a touch panel, comprising a display screen and a supporting frame configured to mount the display screen thereon; and
an outer frame in which the touch panel is mounted;
wherein an infrared transmitter and an infrared receiver are provided on the supporting frame, the infrared transmitter being configured to emit infrared light so as to form an infrared light field above the display screen;
wherein the infrared receiver is configured to receive the infrared light emitted by the infrared transmitter and reflected at a floating touch position above the display screen, the infrared transmitter and the infrared receiver cooperating with each other to determine the floating touch position;
wherein the infrared transmitter and the supporting frame are formed as an integral structure;
wherein the supporting frame is provided with an accommodation groove in which the infrared transmitter and a transparent resin encapsulating the infrared transmitter are received, the infrared transmitter is provided on a bottom portion of the accommodation groove with a wiring hole provided through the bottom portion; and
wherein the infrared receiver and the supporting frame are also formed integrally, and the supporting frame is provided therein with a mounting groove in which the infrared receiver is received.

9. The display device according to claim 8, further comprising:
a backlight module, which is provided to abut against the touch panel tightly and is also mounted in the outer frame.

* * * * *